(12) United States Patent
Obermeier-Hartmann et al.

(10) Patent No.: US 9,937,969 B2
(45) Date of Patent: Apr. 10, 2018

(54) AGRICULTURAL VEHICLE

(71) Applicant: CLAAS INDUSTRIETECHNIK GMBH, Paderborn (DE)

(72) Inventors: Robert Obermeier-Hartmann, Bueren (DE); Hendrik Schulze Zumkley, Rietberg (DE); Thomas Schulte, Delbrueck (DE); Ronald L. Satzler, Princeville, IL (US); David C. Janzen, Metamora, IL (US); Carolin Hammacher, Freiberg (DE)

(73) Assignee: CLAAS Industrietechnik GmbH, Paderborn (DE)

( * ) Notice: Subject to any disclaimer, the term of this patent is extended or adjusted under 35 U.S.C. 154(b) by 54 days.

(21) Appl. No.: 14/798,752

(22) Filed: Jul. 14, 2015

(65) Prior Publication Data
US 2016/0023695 A1 Jan. 28, 2016

(30) Foreign Application Priority Data

Jul. 25, 2014 (DE) .................. 10 2014 110 551

(51) Int. Cl.
*B62D 55/06* (2006.01)
*B62D 55/112* (2006.01)
*B62D 55/30* (2006.01)

(52) U.S. Cl.
CPC .......... *B62D 55/1125* (2013.01); *B62D 55/06* (2013.01); *B62D 55/112* (2013.01); *B62D 55/30* (2013.01); *B62D 55/305* (2013.01); *B60G 2300/08* (2013.01); *B60G 2300/32* (2013.01)

(58) Field of Classification Search
CPC ............ B60G 2300/08; B60G 2300/32; B62D 55/104; B62D 55/112; B62D 55/30
USPC ....................... 180/9.5, 9.52, 9.54
See application file for complete search history.

(56) References Cited

U.S. PATENT DOCUMENTS

| 3,047,283 | A | * | 7/1962 | Kivell | B60G 17/06 180/9.6 |
| 3,752,499 | A | * | 8/1973 | Brandstadter | B62D 55/112 180/9.1 |
| 4,325,443 | A | * | 4/1982 | Fischer | B62D 55/08 180/22 |
| 5,316,381 | A | * | 5/1994 | Isaacson | B62D 55/112 305/145 |
| 5,503,238 | A | | 4/1996 | Urbanek et al. | |
| 8,727,047 | B2 | | 5/2014 | Janzen et al. | |

(Continued)

FOREIGN PATENT DOCUMENTS

| GB | 2 301 569 | 12/1996 |
| WO | WO 98/40266 | 9/1998 |
| WO | WO 2013/113484 | 8/2013 |

*Primary Examiner* — Tony H Winner
(74) *Attorney, Agent, or Firm* — Collard & Roe, P.C.

(57) ABSTRACT

An agricultural vehicle having a full-track design with a vehicle structure on each side of which, relative to a vehicle longitudinal axis, a track roller unit is arranged. The track roller unit has roller unit body to which a front deflector roll, a rear deflector roller and a plurality of yoke-type track rollers arranged therebetween are coupled, and an endlessly closed track belt that wraps around the rollers/roller. All the rollers are suspended with respect to the roller unit body in that assigned to a roller or a group of rollers in each case is a spring element, which is acted upon by fluid, for the suspension thereof with respect to the roller unit body.

18 Claims, 3 Drawing Sheets

(56) References Cited

U.S. PATENT DOCUMENTS

2007/0261898 A1   11/2007  Bessette
2014/0216828 A1    8/2014  Janzen et al.
2015/0078871 A1*  3/2015  Eavenson, Sr. ........ B62D 55/02
                                                                414/680

* cited by examiner

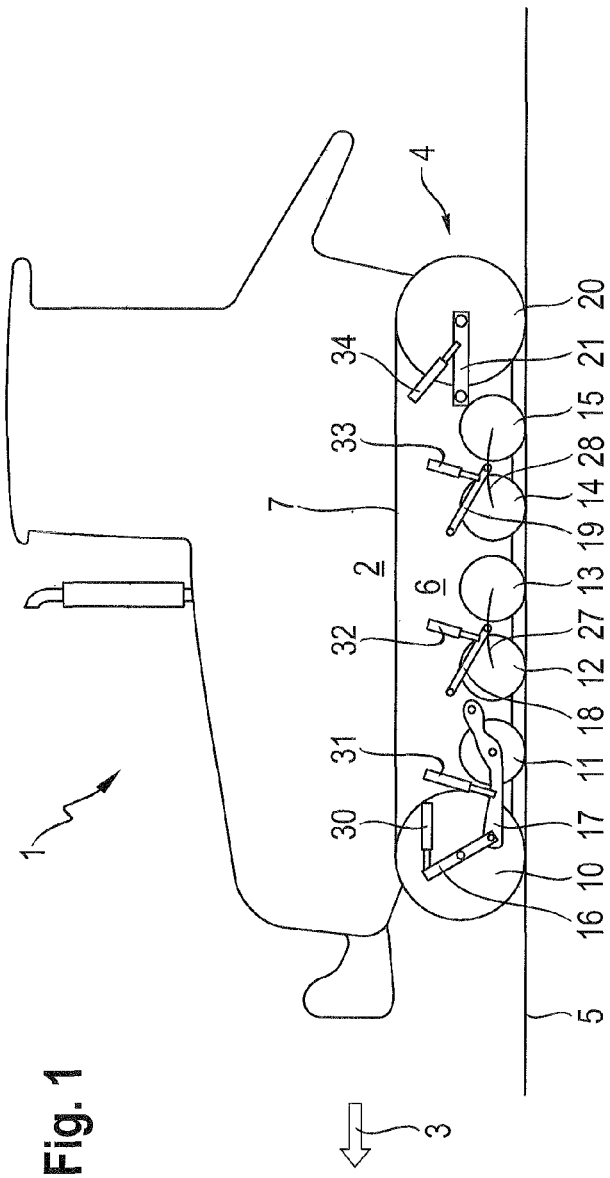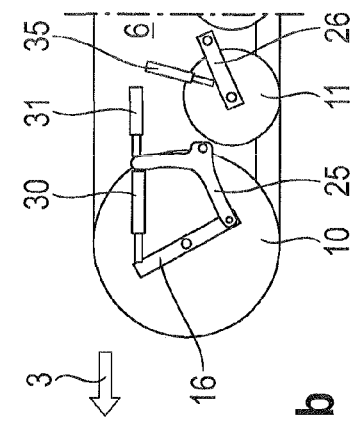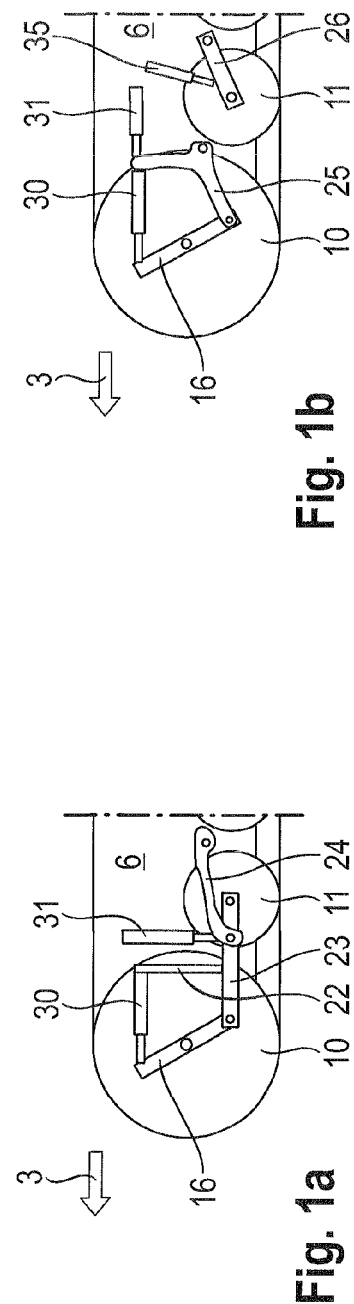

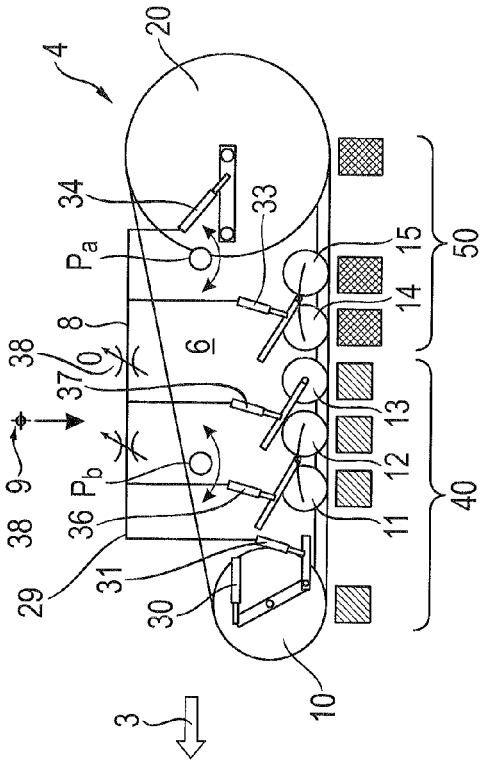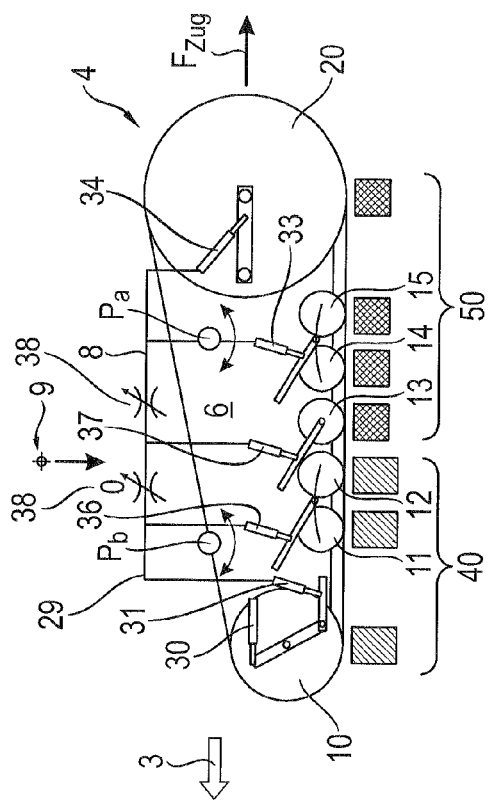

AGRICULTURAL VEHICLE

CROSS-REFERENCE TO A RELATED APPLICATION

The invention described and claimed hereinbelow is also described in German Patent Application DE 10 2014 110551.6, filed on Jul. 25, 2014. The German Patent Application, the subject matters of which is incorporated herein by reference, provides the basis for a claim of priority of invention under 35 U.S.C. 119(a)-(d).

BACKGROUND OF THE INVENTION

The present invention relates to an agricultural vehicle, in particular, a tractor or a harvesting machine having a full-track design and a vehicle structure on each side of which a track roller unit is arranged that comprises a roller unit body to which a front deflector roll, a rear deflector roller and a plurality of yoke-type track rollers arranged therebetween are coupled and an endlessly closed track belt that wraps at least around the front deflector roller and the rear deflector roller along which the yoke-type track rollers roll.

It is known to equip agricultural vehicles such as tractors or harvesting machines with track roller units, which have a larger ground contact area than wheels and therefore have a greater transfer of tractive force with less slip and result in less ground compression. The designs of track-type tractors available on the market can be subdivided into pivot-steered four-track tractors, two-track tractors and half-track tractors.

Pivot-steered four-track tractors are usually found in the upper performance class and, due to their weight and size alone, are less suitable for transport tasks or lighter applications.

Two-track tractors have a track roller unit on each side of the vehicle, relative to the longitudinal axis of the vehicle, which is used to support the vehicle with respect to the ground (full-track design). The track roller units can usually rotate by a small angle about a vehicle transverse axis relative to the vehicle frame, wherein the vehicle frame is designed largely identical to that of a corresponding wheel tractor. Reference is made in this context to WO1998/40266, merely as an example. Two-track tractors must be designed to be nose-heavy, in order to obtain a uniform pressure distribution under the track roller units when the work operation utilizes tractive force.

A uniform distribution of pressure is desired in the case of pulling work, in particular, because this is the only way to utilize the full potential in terms of the transfer of tractive force and protecting the ground. The nose-heaviness required therefor is a disadvantage of conventional two-track tractors, however. The reason is that, in order to achieve the aforementioned advantages, there must be good coordination with the particular drag of the attached implement. However, since the drag can vary greatly between various implements and/or depending on the particular working conditions (e.g., soil properties, tilling depth, ground speed, etc.) in practical applications, an operator must compensate therefor by attaching a suitable front ballast on the vehicle before starting to drive. If tractive forces fluctuate during operation, it is no longer possible to apply ballast correctly. When the nose-heavy vehicle travels on asphalted roads, the tread bars of the track belt, which are usually made of rubber, are strongly braked and compressed upon entry into the latch, which results in high wear and associated increased operating costs of the vehicle.

Half-track tractors are usually converted wheel machines, in which, e.g., the rear wheels are replaced with track roller units. The altered transmission ratio results in a great reduction of the maximum speed. Track roller units also must be mounted on the front in the case of four-wheel drive tractors, due to the fixed transmission ratio between the front axle and the rear axle. In this context, reference is made to US 2007/0261898 A1 as an example. In addition to an altered suspension behavior of the overall vehicle, reduced operational reliability must be accepted.

WO 2013/113484 A2 makes known another concept for a half-track vehicle. In this case, the (rear) track roller unit is used as a drive element. The front axle (which is designed as a wheel axle) is used only to support vertical forces and as steering support. In this dual-axle vehicle, the track roller unit is suspended in the manner of a pendulum. The track therefore lifts up when tractive force is generated. This is avoided by controlled counterpressure of a hydraulic cylinder. The front axle is relieved by applying tractive force and by the force of the hydraulic cylinder. It is therefore possible to hold the pressure distribution under the track roller unit constant during field work. During road travel, however, the hydraulic force can be reversed and, therefore, the front deflector roller of the track roller unit can be relieved. The front axle (wheel axle) therefore assumes a greater load. This results in a more gentle entry by the track bars and therefore reduces wear. As compared to the classic two-track tractor, this concept provides advantages both on yielding ground and on hard ground. The front axle additionally reduces pitching oscillations and, therefore, increases driving comfort.

Since the vehicle described in WO 2013/113484 A2 has a non-driven front axle, the disadvantage of having to provide precise ballast exists in this case as well. A front axle load of zero would be ideal for tractive efficiency. In this case, there is a risk, however, that the vehicle could tip backward and therefore the front axle must remain loaded to a slight extent. This load cannot be used to transfer tractive force, however, and can compress the ground if the tires are too small. It would be conceivable also to drive the front axle. It would be too complex to adjust the advance that is required due to the different tractive force characteristics of wheel and track, however, especially since agricultural tractors are usually not equipped with an interaxle differential.

In addition to a hydraulic element on the track roller unit, the vehicle according to WO 2013/113484 A2 also has a high-value steering axle. Due to the low intended front axle load, the vehicle is equipped with differential steering in the rear axle, with which the Ackermann steering system of the front axle must be synchronized. In light of the above-described aspects, the overall complexity of the vehicle is high.

SUMMARY OF THE INVENTION

The present invention overcomes the shortcomings of known arts, such as those mentioned above.

To that end, the present invention provides a vehicle of the initially mentioned type, by which, given a reasonable design complexity, uniform support is obtained over a majority of the roller unit length also in the event of different ballasts and tractive forces, wherein the objective is reduce the wear of the track belt during road travel and, in general, to increase the driving comfort.

In an embodiment, the invention provides a tractor or a harvesting machine having a full-track design and a vehicle structure on each side of which a track roller unit is arranged that comprises a roller unit body to which a front deflector roll, a rear deflector roller and a plurality of yoke-type track rollers arranged therebetween are coupled and an endlessly closed track belt that wraps at least around the front deflector roller and the rear deflector roller along which the yoke-type track rollers roll. All the rollers of the track roller unit are suspended with respect to the roller unit body in that assigned to a roller or a group of rollers in each case is a spring element, which can be acted upon by fluid, for the suspension thereof with respect to the roller unit body.

By the inventive suspension of all rollers with respect to the roller unit body, the vehicle weight is uniformly accommodated in a wide range, i.e., along the entire effective length of the track roller unit, in the event of different ballasts and tractive forces and is supported on the ground. As compared to classic two-track tractors, the risk of soil compression caused by imprecise ballast application is therefore substantially reduced and the capability of transferring tractive force is increased. Given that, according to the invention, a roller or a group of rollers has assigned thereto a spring element that is acted upon by fluid for the suspension thereof with respect to the roller unit body, the suspension behavior of the vehicle is influenced in a controlled manner. The reason is that spring elements that are acted upon by fluid have the advantage of compensating in a less abrupt manner as compared to steel or rubber springs, the characteristic curves of which must always suffice for the greatest possible load. In addition, these are easily adapted to the load and vary their damper to a great extent. So-called Hydrops are preferably used for this purpose, i.e., hydropneumatic spring elements, preferably with a level control system. The use of spring elements that are acted upon by fluid advantageously makes it possible to influence the acting contact forces, in order to thereby relieve or load a part of the track roller in a controlled manner as needed. As a result, reduced track bar wear occurs during road travel, for example, or a more uniform pressure distribution under the track roller unit occurs during pulling work, which, in turn, protects the ground and increases the tractive force efficiency. Such a suspension of the rollers also makes it possible to increase the driving comfort in general, since the load is adjusted and the spring characteristics can, in fact, be changed. In addition, the relatively great roller unit length (full-track design) results in low susceptibility of the vehicle to pitching oscillations.

Various structural configurations of the vehicle are conceivable. According to an embodiment, the roller unit body of a track roller unit is attached to the vehicle structure. In this case, the roller unit body is a separate component, to which the associated deflector rollers and yoke-type track rollers of the track roller unit are coupled and which is attached to the side of a vehicle structure, e.g., via a flange connection.

In an embodiment, the roller unit body of a track roller unit is an integral component of the vehicle structure. In this case, the roller unit body is not designed as a separate component, but rather is part of the vehicle structure. The deflector rollers and yoke-type track rollers are therefore coupled to the vehicle structure, e.g., by shafts and/or axles which are supported with respect to the vehicle structure and protrude laterally therefrom.

Very generally, in particular independently of the design of the vehicle structure and the roller unit body, the vehicle provides means for distributing a ground pressure proceeding from the vehicle onto individual spring elements and/or onto one or more groups of spring elements. Basically this can be any means with which a ground pressure can be distributed, the ground pressure being caused, in particular, by the weight of the vehicle.

Advantageously, the vehicle has a fluid system for supplying the spring elements that are acted upon by fluid, in which certain spring elements, which can be selected, in particular depending on the event, are interconnected in a separate fluid circuit (or are permanently interconnected) in order to form a suspension unit. By interconnecting a plurality of spring elements in a fluid circuit, which is closed per se, an identical fluid pressure is present at all of the spring elements associated with the thusly formed suspension unit such that, advantageously, a uniform load distribution on the applicable spring elements or rollers associated therewith automatically (autonomously) sets in.

Various embodiments of the arrangement are conceivable. Advantageously, a suspension unit formed by a common fluid circuit has a pendulum point, which forms a virtual axle of the vehicle. In this case, the hydropneumatic suspension simulates an axle that can pivot about this pendulum point.

In order to influence the load distribution of the vehicle, it is furthermore advantageous to assign at least one spring element of a track roller unit to a front suspension unit in order to form a virtual front axle, and at least one spring element of the same track roller unit can be assigned to a rear suspension unit in order to form a virtual rear axle.

The above-described suspension concept can have diverse designs. According to an advantageous development, at least one yoke-type track roller of a track roller unit can be assigned to either the virtual front axle or of the virtual rear axle, depending on an operating parameter of the vehicle, by connecting the associated spring element to a corresponding fluid circuit. By the changeable assignment of the (at least one) yoke-type track roller to either the front or the rear axle, it is possible to reduce a pressure difference that may be present between the axles by pressure compensation. The operating parameters to utilize can be, for example: fluid pressure in the spring elements of the front or the rear axle and/or yoke-type track roller, ground speed of the vehicle. Advantageously, a hysteresis is provided in order to prevent constant switching if the fluctuations about a limit value are only slight. In addition, sensors for pressure detection are expediently assigned to individual spring elements, wherein the assignment to yoke-type track rollers is carried out depending on the thusly detected pressure state of one or more spring elements.

Advantageously, the vehicle is very generally equipped with means for influencing a pressure distribution between front spring elements and rear spring elements of the track roller unit depending on the detected operating parameters of the vehicle, such as the tractive force. It is therefore possible to adjust the ground pressure underneath the track roller unit depending on the operating state of the vehicle in order to increase the traction or the tractive force efficiency, or to protect the ground.

Advantageously, this can be technically implemented by providing the vehicle with means for influencing the fluid pressures of separate fluid circuits between one another, in particular a fluid circuit associated with the virtual front axle and a fluid circuit associated with the virtual rear axle, and/or for influencing the fluid pressure within a fluid circuit, preferably depending on the detected operating parameters of the vehicle in each case. The operating parameters that can be used here are, e.g., tractive force of the vehicle, fluid pressure in the spring elements of the front or the rear axle and/or yoke-type track roller, ground speed of the vehicle.

In order to reduce the wear of the track belt, the vehicle is advantageously operated in a road-travel mode, in which spring element of the virtual front axle are acted upon by reduced pressure as compared to a field-travel mode.

The efficiency and traction of the vehicle during use for work, in particular for pulling work, is advantageously increased in that spring elements of the virtual front axle are acted upon by a pressure that is dependent on an applied tractive force of the vehicle, in particular, with the goal of reducing the sum of effective torques at the track roller unit, preferably bringing this to zero.

Given that a rear spring element of the track roller unit is acted upon by increased fluid pressure by individual control, the track roller unit is prevented from lifting up in the event of particularly high tractive force. The background of this function is that a rear pendulum point of the track roller is displaced further toward the rear by applying pressure to the rear spring element, whereby the track roller unit remains in the lying position even in the event of a high effective tractive force.

According to a structurally advantageous embodiment, at least one or more rollers of a track roller unit are coupled to the roller unit body. A linkage in this case can consist of one or more retaining elements, which are connected to one another and can be used to couple one or more rollers.

In an embodiment, the front deflector roller and a yoke-type track roller, which is located behind this relative to the longitudinal axis of the vehicle, are connected to the roller unit body via a common support arrangement. Assigned to the support arrangement is a spring element for the suspension thereof with respect to the roller unit body. Advantageously, a virtual front axle is formed by this support arrangement. Preferably, this is designed such that the support arrangement comprises a longitudinal swing arm, which is coupled to the roller unit body, and an arm, which is coupled to the longitudinal swing arm. The front deflector roller is supported at the arm and the yoke type track roller is supported at the longitudinal swing arm. Assigned to the arm is a tensioning device, preferably in the form of a cylinder, which is acted upon by fluid pressure, in order to apply tension in the track belt. It should be noted that various embodiments for a virtual front axle are conceivable, including embodiments deviating therefrom.

BRIEF DESCRIPTION OF THE DRAWINGS

Further features and advantages of the invention will become apparent from the description of embodiments that follows, with reference to the attached figures, wherein:

FIG. 1 depicts a schematic view from the side of an agricultural tractor comprising a track roller unit;

FIG. 1a depicts a front part of a track roller unit, which has an altered coupling of the front rollers as compared to the track roller unit of the tractor shown in FIG. 1;

FIG. 1b depicts a front part of a track roller unit, which has another altered coupling of the front rollers as compared to the track roller unit of the tractor shown in FIG. 1;

FIG. 3a depicts a track roller unit of a tractor having a changeable inner allocation during road travel; and FIG. 3b depicts a track roller unit of a tractor having a changeable inner allocation during field travel.

DETAILED DESCRIPTION OF THE PREFERRED EMBODIMENTS

Figure 2A:
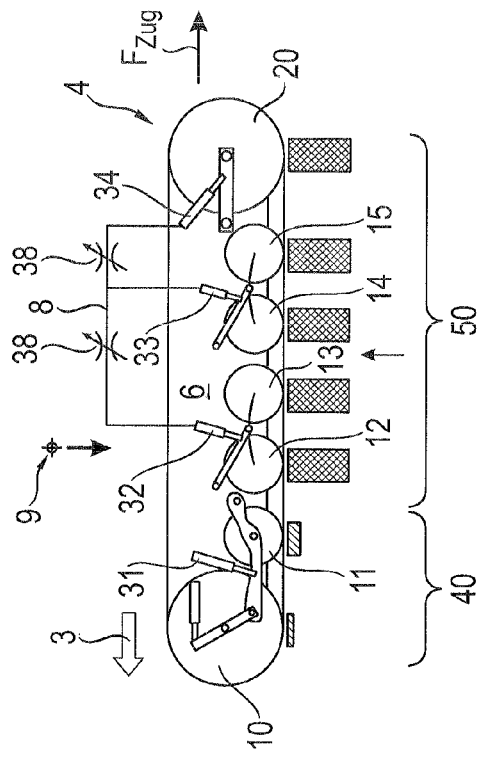
FIG. 2a depicts the track roller unit of the tractor shown in FIG. 1, with an indicated inner allocation of the roller unit.

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

FIG. 1 depicts a schematic view from the side of an agricultural tractor 1 according to the invention during travel on the field 5. The tractor 1 is designed with a full-track configuration and has a vehicle structure in the form of a vehicle frame 2. A track roller unit 4 is attached to the vehicle frame 2, on both sides relative to a vehicle longitudinal axis 3 (indicated by an arrow), i.e.; on the left and the right sides of the vehicle frame 2. The tractor is supported with respect to the ground exclusively via the two track roller units 4. Since the view is from the side, only the track roller unit 4 on the left, relative to the vehicle longitudinal axis 3, is visible in FIG. 1. A right track roller unit, which has a design identical to that of the left track roller unit 4 shown, is located correspondingly on the right side of the frame 2. Since the two track roller units have an identical design, the descriptions of the left track roller unit 4 provided in the following apply equally to the right track roller unit.

In order to carry out intended work, such as pulling work, the tractor 1 is equipped with at least one suitable coupling device in a manner that is known per se and is therefore not shown in greater detail, thereby allowing an implement (e.g., a tillage implement, such as a plow) to be pulled by the tractor 1. It should be noted that the invention is described here using a tractor 1 as an example, but is not limited to this type of agricultural vehicle. As an alternative, the vehicle could be, e.g., a self-propelled harvesting machine such as a combine harvester, forage harvester, or a baler.

As indicated in FIG. 1, the track roller unit 4 of the tractor 1 comprises a roller unit body 6. This is rigidly connected to the vehicle frame 2, e.g., via a flange connection. The following are coupled to the roller unit body 6 by means of linkage, which will be explained further below: a front deflector roller 10, a rear deflector roller 20, and a plurality of (e.g, five) yoke-type track rollers 11, 12, 13, 14, 15 arranged therebetween. It should be noted that, instead of the embodiment shown (comprising a roller unit body 6 attached to the vehicle frame 2), it is conceivable that the roller unit body of a track roller unit is an integral component of the vehicle structure. In this (non-illustrated) case, the deflector rollers and yoke-type track rollers would be coupled to the vehicle structure, which also functions as a roller unit body in this case.

In the embodiment of FIG. 1, in the front region of the track roller unit 4, an endlessly closed track belt 7 wraps around half (i.e., with a wraparound of 180°) of the front deflector roller 10 and, in the rear region of the track roller unit 4, wraps around half of the rear deflector roller 20. The yoke-type track rollers 11, 12, 13, 14, 15 have the same diameter, wherein the pivot points of the yoke-type track rollers 11, 12, 13, 14, 15, in the state depicted, are located on an imagined line such that all five yoke-type track rollers 11, 12, 13, 14, 15 roller together with the front deflector roller 10 and the rear deflector roller 20 along a lower section of the track roller unit 7, which rests on the ground 5.

The roller unit body 6 is therefore supported on the lower section of the track roller unit 7 by the seven rollers 10, 11, 12, 13, 14, 15, 20 in all. It should be noted that the deflector rollers and the yoke-type track rollers can also have sizes relative to one another that deviate from the embodiment shown. In particular, the sizes of the front and the rear deflector rollers can differ from one another. In addition, the sizes of the yoke-type track rollers can differ from one another.

In order to transfer drive power to the track roller unit 4, the rear deflector roller 20 is expediently driven via a (non-illustrated) drive train. In order to ensure a belt tension that is required for reliable operation, a tensioning device is assigned to the front deflector roller 10. This tensioning device comprises a cylinder 30, which is acted upon hydraulically by pressure, is supported at the roller unit body 6 and affects the position of the front deflector roller via a linkage (substantially, the arm 16) in order to hold the track belt 7 under tension by applying a force directed outwardly relative to the track belt 7 (specifically in this case: toward the front).

In the case of the tractor 1, all the rollers 10, 11, 12, 13, 14, 15, 20 of the track roller unit 4 are suspended relative to the roller unit body 6 in order to ensure uniform support along a majority of the roller unit length also in the event of different ballasts and tractive forces, in order to reduce the wear on the track belt during road travel and, in general, to increase driving comfort. To this end, a particular spring element 31, 32, 33, 34 is respectively assigned to an individual roller 20 or a group of rollers 10, 11; 12, 13; 14, 15. These are spring elements that can be acted upon by fluid, preferably Hydrops with a level control system, which are supported at one end with respect to the roller unit body 6 and which, at an opposite end, are each connected to a linkage to which one or two rollers are coupled. Spring elements that are acted upon by fluid (such as Hydrops) have the advantage of compensating in a less abrupt manner and of load adaptability as compared to steel or rubber springs. In addition, the damper thereof can vary to a great extent. The front deflector roller 10 is rotatably supported at the elongated arm 16. An upper end of the arm 16 is connected to the belt tensioning cylinder 30. An opposite end of the arm 16 is connected to a longitudinal swing arm 17 via a pivot joint.

The longitudinal swing arm 17 is rotatably supported, at a rear end, at the roller unit body 6. A cylinder 31, which is connected to the longitudinal swing arm 17 in a central section, is supported at the roller unit body 6 in order to suspend the longitudinal swing arm 17 with respect to the roller unit body 6. A yoke-type track roller 11, which is located directly behind the front deflector roller 10 relative to the vehicle longitudinal axis 3, is rotatably supported at the longitudinal swing arm 17. Therefore, the front deflector roller 10 and the yoke-type track roller 11 are jointly suspended with respect to the roller unit body 6, wherein the suspension takes place, in particular, by a change in the length (inward deflection) of the cylinder 31. The cylinder 30, however, is used primarily to maintain a desired belt tension.

Another pair of successively arranged yoke-type track rollers 12, 13 is located behind the yoke-type track roller 11 relative to the vehicle longitudinal axis 3. These are coupled to the roller unit body 6 via a structure comprising a longitudinal swing arm 18 and a pendulum arm 27. To this end, the longitudinal swing arm is rotatably supported, at the upper end thereof, at the roller unit body 6 and, at an opposite end, accommodates the curved pendulum arm 27 so as to allow this to pivot about a central coupling point. A yoke-type track roller 12 and a yoke-type track roller 13 are rotatably supported at the pendulum arm 27 at either end of the pendulum arm 27. A cylinder 32 connected to the longitudinal swing arm 18 is supported at the roller unit body 6 in order to suspend the longitudinal swing arm 18 and the pendulum arm 27 connected thereto with respect to the roller unit body 6. Due to the kinematic configuration, the two yoke-type track rollers 12, 13 are jointly suspended with respect to the roller unit body 6, wherein the suspension takes place by means of a change in the length (inward deflection) of the cylinder 32.

In the same manner as described in the preceding paragraph, the yoke-type track rollers 14, 15 are coupled to the roller unit body 6 via a structure comprising a longitudinal swing arm 19 and a pendulum arm 28, wherein the suspension is enabled by a cylinder 33. The mechanical design and the action thereof correspond to that utilized for the support of the yoke-type track rollers 12, 13, and so reference is made to those descriptions in order to avoid repetition.

The rear deflector roller 20 is supported with respect to the roller unit body 6 by a longitudinal swing arm 21. A front end, relative to the vehicle longitudinal axis 3, of the longitudinal swing arm 21 is rotatably connected to the roller unit body 6. The rear deflector roller 20 is rotatably supported at an opposite (rear) end of the longitudinal swing arm 21. A cylinder 34, which is connected to the longitudinal swing arm 21 in a central section, is supported relative to the roller unit body 6 in order to suspend the longitudinal swing arm 21 relative to the roller unit body 6. The rear deflector roller 20 is therefore suspended relative to the roller unit body 6, wherein the suspension takes place by a change in length (inward deflection) of the cylinder 34.

The kinematic structure of the track roller unit 4 shown in FIG. 1, in particular the coupling of individual rollers to the roller unit body 6, the assignment of rollers to spring elements, the number of rollers, etc., can be configured in a manner that deviates from the embodiment in diverse manners. FIGS. 1*a* and 1*b* each show, as examples, an altered coupling option for the front rollers 10, 11.

According to FIG. 1*a*, instead of the longitudinal swing arm 17 (FIG. 1), an arrangement is used which comprises a longitudinal swing arm 24 and a T-shaped component, which is connected thereto in an articulated manner and comprises a longitudinal beam 23 and a vertical support 22 rigidly connected thereto. In contrast to the arrangement according to FIG. 1, the cylinder 31 acts at a connection point between the longitudinal swing arm 24 and the longitudinal beam 23.

According to FIG. 1*b*, the front deflector roller 10 and the trailing support wheel 11 are supported separately with respect to the roller unit body 6. The arm 16, on which the front deflector roller 10 is supported, is now connected to an angled spring swing arm 25, which is supported in a central region so as to be rotatable with respect to the roller unit body 6. A cylinder 31 is used again in order to suspend the front deflector roller 10, the cylinder now acting at an upper end of the spring swing arm 25, however. The yoke-type track roller 11 is supported with respect to the roller unit body 6 by a separate longitudinal swing arm 26 and a separate (additional) cylinder 35 is used for the suspension of the yoke-type track roller 11.

The mode of operation of the tractor 1, the mechanical structure of which was described with reference to FIG. 1, is explained in greater detail in the following with reference to FIG. 2a, 2b, 2c, each of which shows only one track roller unit 4, for clarity, in various situations of use. The hydraulic connection and the load distribution underneath the track roller unit are schematically depicted.

FIG. 2a shows the track roller unit 4 of the tractor 1 shown in FIG. 1, including an inner allocation of the roller unit. It is initially evident that assigned to each of the rollers 20 and the pairs of rollers 10, 11; 12, 13; 14, 15 is a spring element, which is acted upon by fluid, in the form of a cylinder 31, 32, 33, 34 ("Hydrop"). In particular, the spring element 34 is assigned to the roller 20, the spring element 31 is assigned to the roller pair 10, 11, the spring element 32 is assigned to the roller pair 12, 13, and the spring element 33 is assigned to the roller pair 14, 15.

As depicted in FIG. 2a, the spring element 31 is assigned to a front suspension unit 40, which forms a virtual front axle 40 of the tractor 1 (which is not shown in entirety here). By contrast, the spring elements 32, 33, 34 are assigned to a rear suspension unit 50, which forms a virtual rear axle 50 of the tractor 1. The track roller unit 4 is therefore subdivided, in the interior thereof, into two suspension units, which function as the virtual front axle 40 and the virtual rear axle 50. In the case shown; the designation "front wheel" (=front axle 40) and "rear track" (=rear axle 50) is obvious due to the different effective lengths of the virtual axles (relative to the respective contact area).

The cylinder 31 of the virtual front axle 40 comprises a separate hydraulic supply (which is not depicted in greater detail), thereby enabling the ground pressure thereof to be set separately. The cylinders 32, 33 and 34, however, are connected to a common hydraulic circuit 8. A shut-off valve 38 is arranged at a connecting tube between the cylinder 32 and the cylinder 33, and a shut-off valve 38 is arranged at a connecting tube between the cylinder 33 and the cylinder 34. In the state shown in FIG. 2a, both shut-off valves 38 are open, and therefore hydraulic fluid located in the hydraulic circuit 8 can be distributed freely and with equal pressure onto the cylinders 32, 33, 34. A ground pressure applied by the center of gravity 9 of the tractor 1 (which is not depicted in entirety here) onto the roller unit 4 is accommodated partially by the virtual front axle 40 and partially by the virtual rear axle 50. The engagement of the cylinders 32, 33, 34 thereby advantageously ensures a uniform distribution of force underneath the region of the virtual rear axle 50 itself when there are fluctuating external effects of force, as indicated by the equal-length bars underneath the rollers 12, 13, 14, 15, 20.

As shown, there is an unequal distribution of force between the rollers 10 and 11, which are assigned to the cylinder 31. The unequal distribution of force is caused by the kinematic configuration, in particular the mechanical advantages of the holding structure.

Figure 2B:
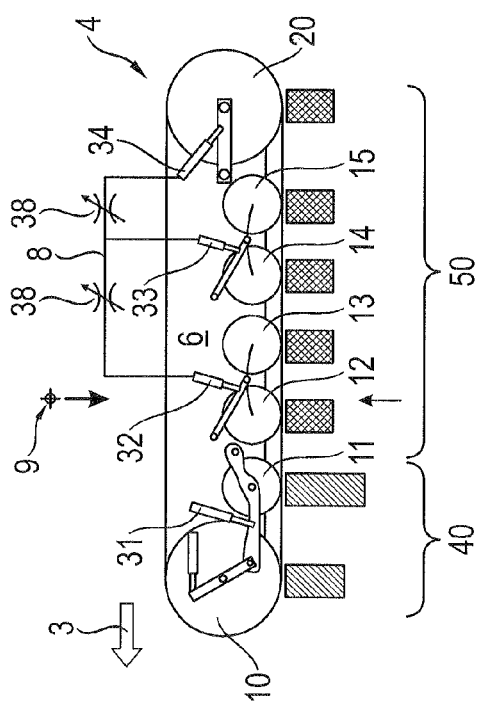
FIG. 2b depicts the track roller unit of the tractor shown in FIG. 1, with a normal tractive load.

FIG. 2b shows the state in which the track roller unit 4 is acted upon by a pulling force, e.g., when a tractor 1 equipped with the track roller unit 4 performs pulling work, i.e., pulls a plow. Advantageously, it is now possible (despite the effect of the tractive force $F_{Zug}$) to relieve pressure from the front axle 40 to the extent that the sum of the moments acting on the track roller unit 4 becomes zero (or nearly zero). This is possible due to the separate hydraulic supply of the virtual front axle 40 as compared to the virtual rear axle 50. The distribution of force underneath the region of the rear axle 50 remains constant due to the interconnection of the cylinders 32, 33, 34, even when the tractive force $F_{Zug}$ changes (again: equal-length bars underneath the rollers 12, 13, 14, 15, 20), and increases only in sum (due to the reduced load on the virtual front axle 40).

If the tractor is operated using a particularly high tractive force $F_{Zug}$, the track roller unit 4 is prevented from lifting up by a particular overload mode. Reference is made to FIG. 2c in this context. In contrast to the states according to FIGS. 2a and 2b, a shut-off valve 38 arranged between the cylinders 33 and 34 is closed (indicated by: "0") in the overload mode (FIG. 2c). The cylinder 34 is therefore acted upon by an increased hydraulic pressure individually, i.e., hydraulically decoupled from the cylinders 32, 33. By individual control, the cylinder 34 (even if the entire tractor 1 is compressed) can apply a greater force, as indicated in FIG. 2c by the longer bar underneath the roller 20 as compared to the equally-long bars underneath the rollers 12, 13, 14, 15. Due to the increased cylinder force 34, the pendulum point of the track roller unit 4 is displaced toward the rear, whereby a lifting-up of the track roller unit 4 is prevented or is at least made very difficult.

Figure 2C:
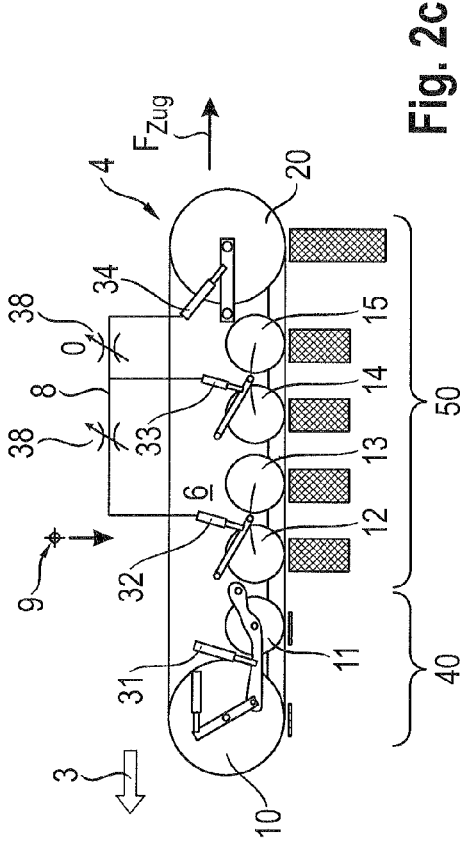
FIG. 2c depicts the track roller unit of the tractor shown in FIG. 1, with an overload.

In the tractor 1 shown in FIGS. 1 to 2c, the assignment of the rollers to the virtual front and rear axles 40 and 50, respectively, is structurally predetermined and, therefore, is permanent. As an alternative, a changeable assignment of rollers to basically any number of virtual axles also is conceivable.

FIGS. 3a and 3b show a track roller unit 4 of a tractor having a changeable assignment between a central yoke-type track roller 13 in various operating states (road and field travel). The track roller unit 4 according to FIGS. 3a and 3b has a structure explained in the following.

The front deflector roller 10 is suspended via a separate cylinder 31, and the rear deflector roller 20 is suspended via a separate cylinder 34. A front pair of yoke-type track rollers 11, 12 is suspended jointly via a cylinder 36, and a rear pair of yoke-type track rollers 14, 15 is suspended jointly via a cylinder 33. A support roller 13 arranged between the support roller 12 and the support roller 14 relative to the vehicle longitudinal axis 3 is suspended via a separate cylinder 37.

The front cylinders 31, 36 belong to a first hydraulic circuit 29 and are always acted upon by the same pressure; the rear cylinders 33, 34 belong to a second hydraulic circuit 8 and are always acted upon by the same pressure. By shut-off valves 38, the cylinder 37 can be connected either to the first hydraulic circuit 29, as shown in FIG. 3a, or to the second hydraulic circuit 8, as shown in FIG. 3b. The track roller unit 4 therefore has a hydraulic supply, according to which the cylinder 37 is connected either together with the cylinders 31, 36 to a front suspension unit (virtual front axle 40) or together with the cylinders 33, 34 to a rear suspension unit (virtual rear axle 50).

In this case as well, a uniform distribution of contact forces is achieved within a suspension unit (virtual front or rear axle) by the interconnection of associated cylinders, as depicted by the respective equal-length bars underneath associated cylinders). Due to the possibility of changing the assignment of the cylinder 37 to the front or the rear axle, the weight acting on the track roller unit 4 can be redistributed in order to eliminate pressure peaks. This can take place depending on the type of load (with or without tractive force) and/or on the driving state (field travel, road travel) of the tractor. It is therefore possible to adjust the pressure distribution underneath the track roller unit 4 independently of the ballast applied to the vehicle overall.

Given that different hydraulic circuits are generated, pendulum points $P_a$, $P_b$ having changeable positions are generated for each virtual axle 40, 50. In the state according to FIG. 3*a* (cylinder 37 assigned to the first hydraulic circuit 29), the fluid circuit 29 assigned to the front axle 40 has the pendulum point $P_b$, while the fluid circuit 8 assigned to the rear axle 50 has the pendulum point $P_a$.

In contrast to FIG. 3*a*, in the state according to FIG. 3*b* (the cylinder 37 is assigned to the second hydraulic circuit 8), the pendulum point $P_b$ of the front axle 40 and the pendulum point $P_a$ are each displaced substantially toward the front.

Basically it is also conceivable that a vehicle operator manually specifies the assignment of the cylinder 37 to the front or the rear axle. Preferably, the intended pressure compensation between the front axle 40 and the rear axle 50 can take place automatically, in particular depending on operating parameters of the tractor 1, such as pressure load and/or driving state. To this end, the cylinders 31, 33, 34, 36, 37 can be assigned sensors for pressure detection, wherein the assignment of the yoke-type track roller 13 is carried out depending on the pressure state that is detected. If a detected pressure difference between the front axle 40 and the rear axle 50 exceeds a predefinable limit, for example, the cylinder 37 of the central yoke-type track roller 13 is assigned to the axle at which the excessive hydraulic pressure is present, in order to reduce the pressure difference between the axles 40, 50. Advantageously, a hysteresis is provided in a control of this type, in order to prevent constant switching if the fluctuations about a limit value are only slight. Further input variables into such a control could be operating parameters such as absolute pressure, the forces occurring on yoke-type track rollers 11, 12, 13, 14, 15, the ground speed, or the like.

The wear on the track roller unit 7 during road travel can be advantageously reduced by applying a pressure to the cylinder of the virtual front axle 40 during road travel that is reduced as compared to a field-travel mode. As an alternative or in addition, it is possible to lower the force acting on the first roller as compared to the further rollers of the same axle by the application of the hydraulics and/or mechanics.

The tractor described by the invention, including different variants that were explained, is more compact and maneuverable than pivot-steered tractors and can therefore also be used on small fields. The basic design as a two-track tractor makes it possible to turn about a track or even about the vertical axis of the vehicle.

The need to apply ballast precisely is reduced as compared to conventional two-track tractors. The user merely needs to roughly apply the ballast to the vehicle by estimating the slip under the track roller unit, or by a visual assessment. The rear part of the track roller unit has a homogeneous distribution of force in the normal operating range. The load on the front part is small in a design according to FIGS. 2*a* to 2*c*, but contributes to the transfer of tractive force.

In the case of the concept of "front track-rear track," shown in FIGS. 3*a* and 3*b*, the distribution of pressure and force is also homogeneous under the front track rollers. In addition, the roller unit can automatically compensate for fluctuations in tractive force (which practically always occur during field work) up to the underloading or overloading of the vehicle.

The suspension comfort is substantially increased by the hydropneumatically suspended track roller unit and, simultaneously, the tendency of the vehicle to pitch is reduced by the relatively long length of the track roller unit. As compared to classic half-track vehicles or vehicles having four mounted tracks, the vehicle described also can be steered better due to differential steering. Track bar wear is reduced by the active control of the front rollers.

As compared to the half-track design according to WO 2013/113484 A2, the design according to the invention does not require a front axle. Thus, there also is no need for coordination with wheels, which may be driven, on the front axle, nor is there a need for synchronization between differential steering of the rear axle and steering of the front axle.

Another advantage of this inventive full track design, and agricultural vehicle comprising same, results from the large contact area, which also makes it usable, in principle, for other agricultural machines, such as, e.g., harvesting machines.

LIST OF REFERENCE NUMBERS

1 tractor
2 vehicle frame
3 vehicle longitudinal axis
4 track roller unit
5 ground
6 roller unit body
7 track belt
8 hydraulic circuit
9 center of gravity
10 front deflector roll
11 yoke-type track roller
12 yoke-type track roller
13 yoke-type track roller
14 yoke-type track roller
15 yoke-type track roller
16 arm
17 longitudinal swing arm
18 longitudinal swing arm
19 longitudinal swing arm
20 rear deflector roll
21 longitudinal swing arm
22 vertical support
23 longitudinal support
24 longitudinal swing arm
25 spring swing arm
26 longitudinal swing arm
27 pendulum arm
28 pendulum arm
29 hydraulic circuit
30 belt tensioning cylinder
31 cylinder
32 cylinder
33 cylinder
34 cylinder
35 cylinder
36 cylinder
37 cylinder
38 shutoff valve
40 (virtual) front axle
50 (virtual) rear axle
$F_{Zug}$ tractive force
$P_a$ rear pendulum point
$P_b$ front pendulum point As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims so limit that.

What is claimed is:

1. An agricultural vehicle having a full-track design and a vehicle structure, on each side of which, relative to a vehicle longitudinal axis, a track roller unit is arranged to support the vehicle with respect to a ground, the track roller unit comprising:
a roller unit body,
a front deflector roller coupled to a front of the roller unit body,
a rear deflector roller coupled to a rear of the roller unit body;
a plurality of yoke track rollers arranged between the front deflector roller and the rear deflector roller and coupled to the roller unit body; and
an endlessly closed track belt, which wraps at least around the front deflector roller, the rear deflector roller and the yoke track rollers;
wherein all of the rollers of the track roller unit are suspended with respect to the roller unit body by hydropneumatic spring elements and wherein the hydropneumatic spring elements are acted upon by fluid for suspending the rollers with respect to the roller unit body.

2. The agricultural vehicle according to claim 1, wherein the roller unit body is attached to the vehicle structure.

3. The agricultural vehicle according to claim 1, wherein the roller unit body of the track roller unit is an integral component of the vehicle structure.

4. The agricultural vehicle according to claim 1, wherein the track roller unit further comprises means for distributing a ground pressure proceeding from the vehicle onto individual ones of the hydropneumatic spring elements, onto one or more groups of the hydropneumatic spring elements or both.

5. The agricultural vehicle according to claim 1, wherein the track roller unit further comprises a fluid system for supplying the fluid to the hydropneumatic spring elements and wherein certain hydropneumatic spring elements are selected depending on an event are interconnected in a separate fluid circuit to form a suspension unit.

6. The agricultural vehicle according to claim 5, wherein the suspension unit formed by the separate fluid circuit has a pendulum point ($P_a$, $P_b$), which forms a virtual axle of the agricultural vehicle.

7. The agricultural vehicle according to claim 5, wherein at least one of the hydropneumatic spring elements of the track roller unit is assigned to a front suspension unit to form a virtual front axle and at least one of the hydropneumatic spring elements of the track roller unit is assigned to a rear suspension unit to form a virtual rear axle.

8. The agricultural vehicle according to claim 7, wherein at least one yoke track roller is assigned either to the virtual front axle or to the virtual rear axle, depending on an operating parameter of the vehicle comprising a pressure load, a vehicle state or both, by connecting the associated hydropneumatic spring element to a corresponding fluid circuit.

9. The agricultural vehicle according to claim 8, wherein the hydropneumatic spring elements are assigned sensors for detecting a pressure state therein and wherein at least one of the yoke track rollers is assigned depending on the detected pressure state one or more of the hydropneumatic spring elements.

10. The agricultural vehicle according to claim 1, further comprising means for influencing a pressure distribution between hydropneumatic spring elements positioned in a front portion of the track roller unit and hydropneumatic spring elements positioned in a rear portion of the track roller unit depending on a detected tractive force ($F_{Zug}$) of the vehicle.

11. The agricultural vehicle according to claim 7, further comprising means for influencing the fluid pressures of a fluid circuit associated with the virtual front axle, a fluid circuit associated with the virtual rear axle or both depending on detected operating parameters of the vehicle.

12. The agricultural vehicle according to claim 11, wherein the vehicle is operated in a street-travel mode, in which the hydropneumatic spring elements of the virtual front axle are acted upon by a pressure that is reduced as compared to that of a field-travel mode.

13. The agricultural vehicle according to claim 7, wherein the hydropneumatic spring elements of the virtual front axle are acted upon by a pressure that depends on an applied tractive force ($F_{Zug}$) of the vehicle to reduce a sum of effective torques at the track roller unit.

14. The agricultural vehicle according to claim 10, wherein the hydropneumatic spring element in the rear portion of the track roller unit is acted upon by increased fluid pressure via individual control to prevent the track roller unit from lifting up in an event of particularly high tractive force ($F_{Zug}$).

15. The agricultural vehicle according to claim 1, wherein one or more rollers are coupled to the roller unit body via linkages.

16. The agricultural vehicle according to claim 1, wherein the front deflector roller and a yoke track roller located behind the front deflector roller relative to the vehicle longitudinal axis are connected to the roller unit body via a common support arrangement and wherein one of the spring elements is assigned to the common support arrangement for suspension thereof with respect to the roller unit body.

17. The agricultural vehicle according to claim 16, wherein the common support arrangement comprises a longitudinal swing arm coupled to the roller unit body, wherein an arm is coupled to the longitudinal swing arm, wherein the front deflector roller is supported at the arm, wherein one of the yoke track rollers is supported at the longitudinal swing arm and wherein a tensioning device is assigned to the arm that is acted upon by fluid pressure in order to apply tension in the track belt.

18. The agricultural vehicle according to claim 17, wherein the tensioning device is a cylinder.

* * * * *